United States Patent
Kashiwagi

(10) Patent No.: US 7,693,358 B2
(45) Date of Patent: Apr. 6, 2010

(54) FIBER OPTIC DISTRIBUTED SENSOR APPARATUS

(75) Inventor: Masahiro Kashiwagi, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 12/392,548

(22) Filed: Feb. 25, 2009

(65) Prior Publication Data

US 2009/0214154 A1 Aug. 27, 2009

(30) Foreign Application Priority Data

Feb. 25, 2008 (JP) ............................ 2008-042570

(51) Int. Cl.
- G02B 6/00 (2006.01)
- G02B 6/02 (2006.01)
- G01N 21/00 (2006.01)
- G01J 5/08 (2006.01)

(52) U.S. Cl. ..................... 385/12; 385/13; 385/123; 385/124; 385/125; 356/73.1; 250/227.11; 250/227.14; 250/227.16; 250/578.1

(58) Field of Classification Search .............. 385/12, 385/13, 123, 124, 125; 356/73.1; 250/227.11, 250/227.14, 227.16, 578.1
See application file for complete search history.

(56) References Cited

U.S. PATENT DOCUMENTS

| 6,285,446 B1* | 9/2001 | Farhadiroushan ......... 356/35.5 |
| 6,380,534 B1* | 4/2002 | Farhadiroushan et al. ......... 250/227.14 |
| 7,283,216 B1* | 10/2007 | Geng et al. ................. 356/35.5 |
| 7,343,074 B1* | 3/2008 | Gallagher et al. ............ 385/125 |
| 2006/0210269 A1 | 9/2006 | Farhadiroushan et al. |

FOREIGN PATENT DOCUMENTS

JP 2006-517677 A 7/2006

OTHER PUBLICATIONS

Kee, Huai Hoo; "1.65 μm Raman-based distributed temperature sensor"; Electronic Letters, Oct. 14, 1999, vol. 35, No. 21, pp. 1869-1871.

* cited by examiner

*Primary Examiner*—Ryan Lepisto
(74) *Attorney, Agent, or Firm*—Westerman, Hattori, Daniels & Adrian, LLP

(57) ABSTRACT

A distributed fiber optic sensor device that employs a photonic band gap fiber as a sensing medium, in which: the photonic band gap fiber, which is the sensing medium, includes: a quartz section; and a plurality of high refractive index portions provided in the quartz section along the longitudinal direction of the fiber, the high refractive index portions being photonic band gaps periodically arranged to form a triangular-lattice pattern; the photonic band gap fiber has a bandwidth in which a wavelength band of a Stokes beam generated due to stimulated Raman scattering is included; and the photonic band gap fiber has a band gap width in which a wavelength band of an anti-Stokes beam generated due to the stimulated Raman scattering and a wavelength band of an optical signal incident into the photonic band gap fiber are included.

5 Claims, 4 Drawing Sheets

FIBER OPTIC DISTRIBUTED SENSOR APPARATUS

BACKGROUND OF THE INVENTION

1. Field of the Invention

The present invention relates to increases in measurement distance, a measurement range, spatial resolution and a dynamic range of a distributed fiber optic sensor device. The distributed fiber optic sensor device according to the present invention is used in measurement of, for example, strain distribution and temperature distribution.

Priority is claimed on Japanese Patent Application No. 2008-42570, filed Feb. 25, 2008, the content of which is incorporated herein by reference.

2. Description of the Related Art

Light incident into an optical fiber is scattered at many locations within the fiber due to Rayleigh scattering, Brillouin scattering and Raman scattering. Scattered light characteristics, such as optical power or frequency, vary in accordance with optical fiber characteristics (i.e., loss property), physical quantities (i.e., temperature and strain) imposed on the optical fiber and physical quantities occurring in an environment of the optical fiber. Techniques for localization, such as Optical Time-Domain Reflectometry (OTDR), are for measuring or sensing, for example, physical quantities imposed on the optical fiber along the longitudinal direction of the optical fiber by observing changes in the scattered light at locations in the optical fiber. For example, Huai Hoo Kee, G. P. Lees and T. P. Newson, "1.65 um Raman-based distributed temperature sensor", Electronics Letters, 1999, Vol. 35, No. 21, pages 1869 to 1871 discloses a distributed fiber optic temperature sensor which takes advantage of the fact that power of Raman scattering light varies depending on temperature. Optical fibers, however, are involved in optical loss (about 0.2 dB/km at the wavelength of 1.55 micrometers in usual single-mode fibers), of which relationship with incident light power and a system dynamic range may limit a measurement range. Especially in Raman scattering, since the power of the anti-Stokes beam caused by the scattering is low, a distributed fiber optic temperature sensor which employs the anti-Stokes beam may have an undesirably limited measurement range.

To increase the incident light power is one way to extend the measurement range. When high-power light of 1 W or greater is incident into the optical fiber, however, a nonlinear phenomenon, e.g., stimulated Raman scattering, occurs within the optical fiber. As a result, as shown in FIG. 7, the incident light is converted into a Stokes beam with the most part thereof being shifted to the longer wavelength side, thereby attenuating the incident light.

Methods of improving the optical fiber itself while satisfying characteristics of usual single-mode fibers have yet to be proposed in order to solve the problem of attenuation in the incident light power due to the stimulated Raman scattering within the distributed fiber optic sensor.

Another method is disclosed in Published Japanese Translation No. 2006-517677 of the PCT International Publication, in which changes caused by the stimulated Raman scattering are utilized in measurement so as to improve a distribution measurement performance. In the disclosed method, once the incident light is converted into a long-wavelength Stokes beam by the stimulated Raman scattering within the fiber, sensing performances thereafter will be conducted using the Stokes beam as the incident light, thereby extending a measurement range. In this method, however, since the wavelength of the incident light is converted along the longitudinal direction of the fiber, the scattered light to be observed also has a varied wavelength. A light-receiving side thus requires more numbers of optical filters. Further, along the longitudinal direction of the fiber, the incident light is gradually converted into the Stokes beam by the stimulated Raman scattering, and therefore, the change in the scattered light cannot be measured in that area. In order to address this problem, the area where the change cannot be measured may be displaced by controlling the incident light power. In this case, however, it is necessary to control the incident light power and thus operations and setups may be complicated.

If the incident light power is increased to extend the measurement range as disclosed in the above-described Huai Hoo Kee, G. P. Lees and T. P. Newson, "1.65 um Raman-based distributed temperature sensor", Electronics Letters, 1999, Vol. 35, No. 21, pages 1869 to 1871, the measurement range is hardly extended due to the stimulated Raman scattering that undesirably limits the range.

If the Stokes beam caused by the stimulated Raman scattering is employed as disclosed in Published Japanese Translation No. 2006-517677 of the PCT International Publication, it is necessary to control the incident light. This may cause the light receiving section to be complicated and undesirably raise the device cost.

The present invention is made in view of the aforementioned circumstances, and an object thereof is to provide a distributed fiber optic sensor device with extended measurement distance, measurement range and dynamic range while maintaining spatial resolution.

SUMMARY OF THE INVENTION

In order to solve the above-described problems and achieve the object, the present invention employs the following.

(1) An aspect of the invention is a distributed fiber optic sensor device that employs a photonic band gap fiber as a sensing medium, in which: the photonic band gap fiber, which is the sensing medium, includes: a quartz section; and a plurality of high refractive index portions provided in the quartz section along the longitudinal direction of the photonic band gap fiber, the high refractive index portions being photonic band gaps periodically arranged to form a triangular-lattice pattern; the photonic band gap fiber has a bandwidth which includes a wavelength band of a Stokes beam generated due to stimulated Raman scattering; and the photonic band gap fiber has a band gap width which includes a wavelength band of an anti-Stokes beam generated due to the stimulated Raman scattering and a wavelength band of an optical signal incident into the photonic band gap fiber.

In the distributed fiber optic sensor device according to (1), light of higher power may be incident into the fiber since the photonic band gap fiber, which suppresses the stimulated Raman scattering, is employed as the optical fiber serving as the sensing medium. The measurement distance, the measurement range and the dynamic range can therefore be extended while maintaining the spatial resolution. In the distributed fiber optic sensor device according to (1), since the photonic band gap fiber suppresses an occurrence of the Stokes beam, a signal-to-noise ratio of the scattered light used as a signal is improved.

(2) The high refractive index portions are preferably arranged to form a 3- to 5-layer pattern.

(3) A pulse light source is preferably provided for inputting the optical signal into the photonic band gap fiber at an end thereof.

(4) A pulse light source is preferably provided for inputting the optical signal into the photonic band gap fiber at both ends thereof.

(5) Transmission loss with respect to the Stokes beam in photonic band gap fiber is preferably 12 to 30 times as large as transmission loss with respect to the optical signal.

(6) Temperature distribution along the longitudinal direction of the photonic band gap fiber is preferably measured.

(7) Strain distribution along the longitudinal direction of the photonic band gap fiber is preferably measured.

DESCRIPTION OF THE PREFERRED EMBODIMENTS

First Embodiment

Figure 1:
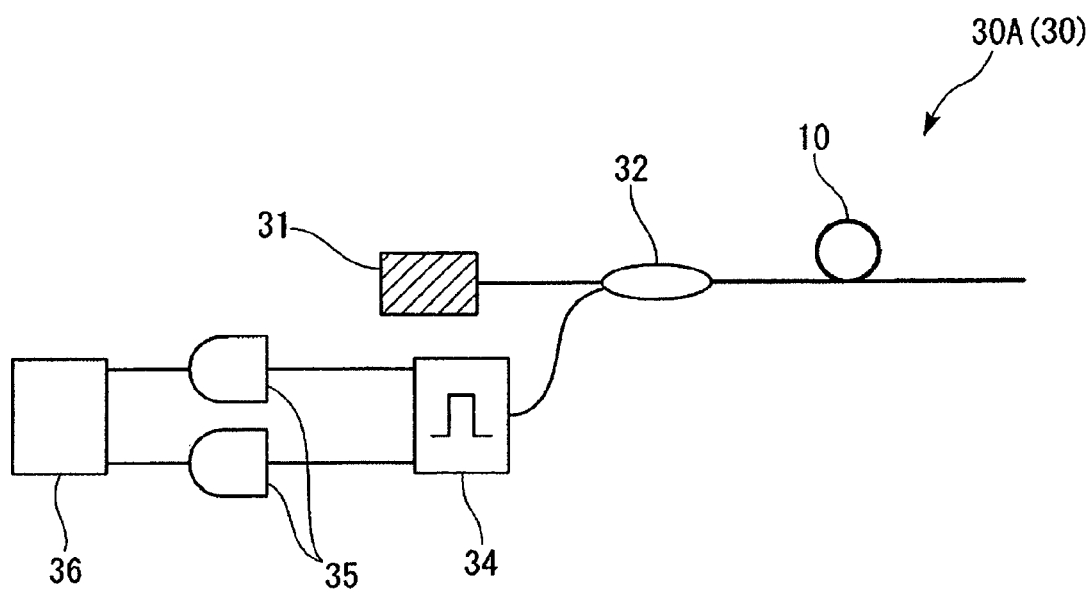
FIG. 1 schematically illustrates a distributed fiber optic sensor device according to an embodiment of the invention.

FIG. 1 schematically shows a distributed fiber optic sensor device according to a first embodiment of the present invention. A distributed fiber optic sensor device 30A of the present embodiment includes a pulse light source 31, an optical branching filter 32, a photonic band gap fiber 10, an optical filter 34, a photodetector 35 and a signal processor 36.

An optical isolator 37 may be included in the present embodiment as in a second embodiment, which will be described later.

Pulsed light output from the pulse light source 31 is incident into the photonic band gap fiber 10 via the optical branching filter 32. The incident light is scattered at locations in the photonic band gap fiber 10. Back-scattered light is received by the photodetector 35 through the optical branching filter 32 again and via the optical filter 34 and is converted into electrical signals. At this time, necessary scattered light (caused by Rayleigh scattering, Brillouin scattering or Raman scattering) is extracted by the optical filter 34. In the signal processor 36, the electrical signals input from the photodetector 35 are converted into distribution of physical quantities along the longitudinal direction of the photonic band gap fiber 10. By observing changes in the physical quantities, physical changes (i.e., temperature and strain) caused in the photonic band gap fiber can be detected.

An object of the present invention is to extend the measurement distance, the measurement range and the dynamic range while maintaining the spatial resolution by employing a suitably designed photonic band gap fiber as a sensing fiber in a distributed fiber optic sensor device.

Figure 2:
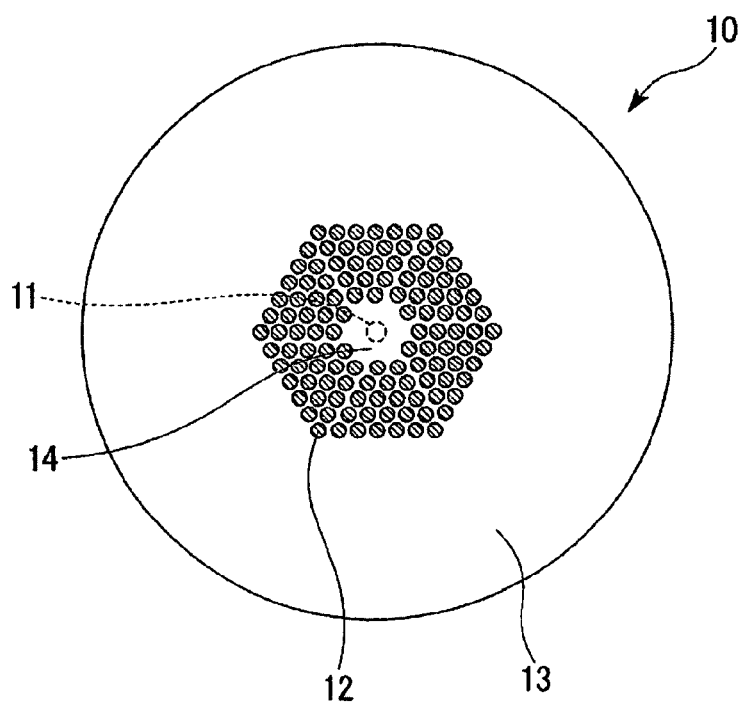
FIG. 2 is a cross-sectional view schematically showing an exemplary photonic band gap fiber according to the embodiment.
Figure 3:
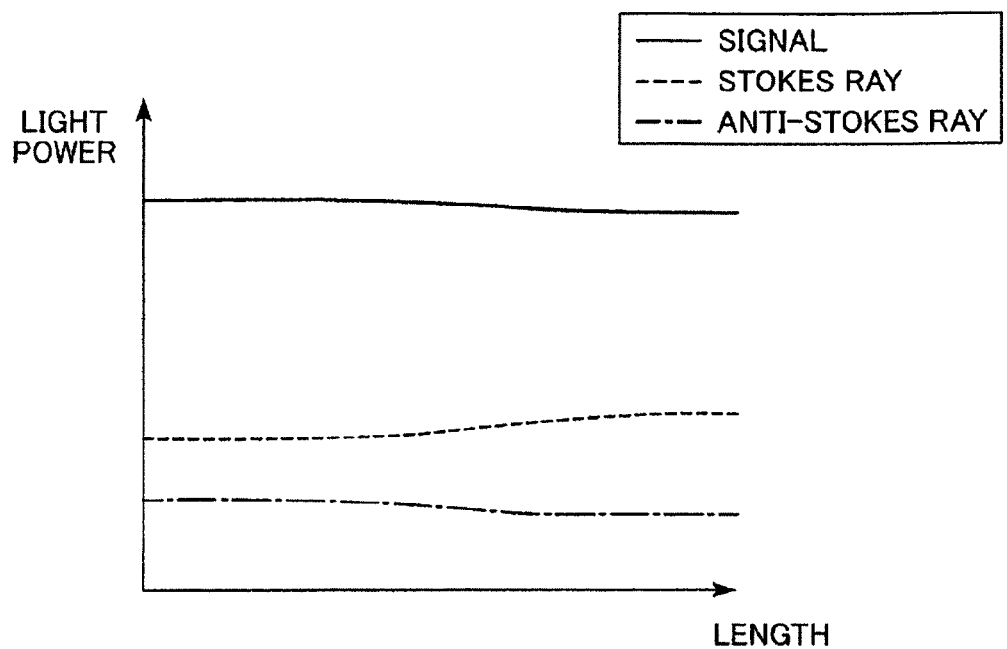
FIG. 3 is a graph showing a relationship between the length of a photonic band gap fiber and optical power characteristics of an optical signal, a Stokes beam and an anti-Stokes beam according to the embodiment.
Figure 4:
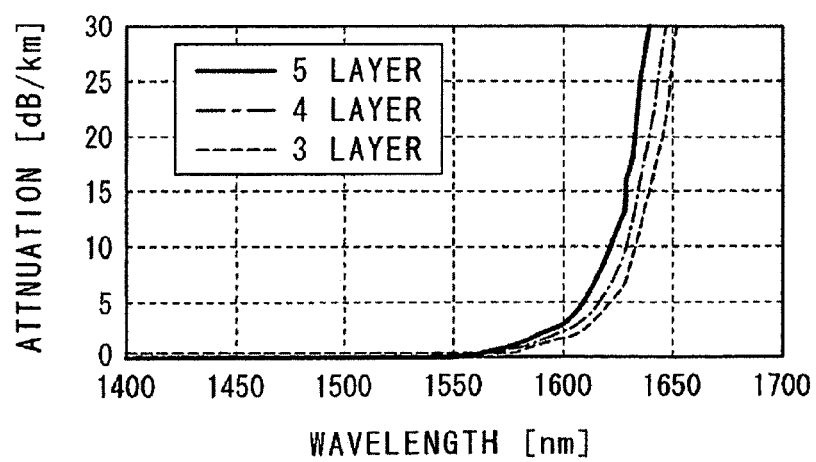
FIG. 4 is a graph showing exemplary wavelength dependency of transmission loss of a photonic band gap fiber according to the embodiment.

FIG. 2 is a cross-sectional view schematically illustrating a configuration of the photonic band gap fiber 10 used as a medium for sensing physical changes, such as temperature and strain, in the distributed fiber optic sensor device 30A according to the present invention. FIG. 3 is a graph showing a relationship between the length of a photonic band gap fiber and optical power of an optical signal, a Stokes beam and an anti-Stokes beam. FIG. 4 is a graph showing an exemplary loss wavelength characteristic of the photonic band gap fiber 10.

The photonic band gap fiber 10 includes a quartz section 13 made of pure quartz, and a plurality of high refractive index portions 12 each having a small circular cross section and laid along the longitudinal direction of the fiber on the quartz section 13. Fluoride, germanium or other substances are added to the high refractive index portions 12 so as to impart higher refractive index than that of pure quartz. The high refractive index portions 12 are periodically arranged at a fixed pitch in a triangular-lattice pattern and form a photonic band gap section.

A core 11 shown by a dotted line in FIG. 2 may be provided in a central portion 14 of the quartz section 13. In this case, the high refractive index portions 12 form a periodic structure surrounding the core 11. With the core 11, a mode field diameter can be controlled easily. If the mode field diameter is to be controlled without the core 11, it is only necessary to narrow the central portion 14 (i.e., an area of the quartz section 13 surrounded by the high refractive index portions 12) of the quartz section 13.

The high refractive index portions 12 are arranged preferably in a 3- to 5-layer pattern and more preferably in a 5-layer pattern. By increasing the number of layers, difference between loss of the optical signal incident into the photonic band gap fiber 10 and loss of the Stokes beam generated due to the stimulated Raman scattering of the optical signal can be increased as described later. This may extend the measurement distance, the measurement range and the dynamic range of the distributed fiber optic sensor device. Meanwhile, arrangement patterns with more than 5 layers are not preferred because it is difficult to produce the photonic band gap fiber 10 of uniform length and a manufacturing cost may become high. In addition, the photonic band gap fiber is produced as a multimode fiber. Arrangement patterns with less than 3 layers reduce a trapping effect of the optical signal incident into the photonic band gap fiber 10 in the central portion 14 of the quartz section 13 and thus the difference between loss of the optical signal and the loss of the Stokes beam becomes smaller. There is also a possibility of increase in the loss of the optical signal.

The photonic band gap fiber 10 is dimensioned as follows: each of the high refractive index portions 12 is about 3 to 5 micrometers in diameter; an interval between adjacent high refractive index portions 12 is about 5 to 8 micrometers; and an outer diameter of the fiber is about 130 to 150 micrometers. A relative refractive index difference between the high refractive index portions 12 and the pure quartz (i.e., the quartz section 13) is about 2.7%. In embodiments with the core 11, the core 11 is about 3 to 5 micrometers in diameter and the relative refractive index difference between the core 11 and the pure quartz (i.e., the quartz section 13) is about 0.7%.

The photonic band gap fiber 10 according to the present invention includes, in a bandwidth thereof, a wavelength band of the Stokes beam generated due to the stimulated Raman scattering. The band gap width includes a wavelength band of the anti-Stokes beam generated due to the stimulated Raman scattering and a wavelength band of the incident optical signal. Therefore, when the optical signal is incident into the fiber and the Stokes beam is generated due to the stimulated Raman scattering, since the wavelength band of the Stokes beam is within the bandwidth, the Stokes beam escapes to the quartz section outside of the high refractive index portions 12 without being trapped in the central portion 14 (i.e., an area surrounded by the high refractive index portions, or the core 11) of the quartz section 13. On the other hand, since the wavelength of the optical signal or the wavelength of the anti-Stokes beam generated due to the stimulated Raman scattering is within the band gap width, light of these wavelengths is guided through the central portion 14 (i.e., the area surrounded by the high refractive index portions, or the core 11) of the quartz section 13. Accordingly, as shown in FIG. 3, even in an elongated photonic band gap fiber, the optical signal is propagated with no attenuation of the light power and the Stokes beam is propagated with no increase in the light power. In an arrangement pattern with 5 layers, rather than with 3 layers, of the high refractive index portions 12 as described above, the light of the wavelength in the band gap width is more effectively trapped in the central portion 14 (or the core 11) of the quartz section 13. Accordingly, even a further elongated photonic band gap fiber can guide the light in a similar mechanism.

FIG. 4 is a graph showing an exemplary loss wavelength characteristic of the photonic band gap fiber 10 in which the high refractive index portions 12 are arranged in a 3- to 5-layer pattern.

Among the wavelength bands of from 1400 nm to 1700 nm shown in FIG. 4, a band of from 1400 nm to 1600 nm is the band gap width and a band of from 1600 nm to 1700 nm is the bandwidth. In the illustrated example, the loss rapidly increases in a wavelength range of near 1560 nm or longer. In the case that pulsed light having the wavelength of 1550 nm is incident from an end of the photonic band gap fiber 10 as an optical signal, the wavelength of the Stokes beam generated due to the stimulated Raman scattering becomes about 1600 nm, which is longer than that of the incident light. Here, the loss is: about 6 dB/km when the high refractive index portions 12 are arranged in a 5-layer pattern; about 4.0 dB/km when the high refractive index portions 12 are arranged in a 4-layer pattern; and about 2.4 dB/km when the high refractive index portions 12 are arranged in a 3-layer pattern. On the other hand, loss of the optical signal (1550 nm in wavelength) is about 0.2 dB/km. Accordingly, the loss of the Stokes beam is 12 to 30 times as large as that of the optical signal. Therefore, if the light having wavelength of 1550 nm is employed as the incident light, for example, the Stokes beam will be blocked rather than allowed to propagate in the photonic band gap fiber 10.

The loss wavelength characteristic may increase loss in desired wavelengths by suitably changing the relative refractive index difference, the diameter and the pitch of the high refractive index portions 12 of the photonic band gap fiber 10. Alternatively, a cutoff wavelength may be controlled by suitably changing a bending diameter and the number of turns of the photonic band gap fiber.

As described above, in the photonic band gap fiber 10 according to the present invention, the stimulated Raman scattering can be suppressed without impairing the sensing performance since the loss may be selectively given to the wavelength of the Stokes beam generated due to Raman scattering. Light with higher power can therefore be incident into the photonic band gap fiber 10. Therefore, in the distributed fiber optic sensor device in which this fiber is employed, the measurement distance, the measurement range and the dynamic range can be extended while maintaining the spatial resolution. In addition, since the Stokes beam can be suppressed, a signal-to-noise ratio of the scattered light used as a signal is improved and more accurate measurement can therefore be provided.

For example, in temperature detection using the distributed fiber optic sensor device according to the present invention, the light intensity of the anti-Stokes beam depends on the temperature of the optical fiber. For this reason, in the distributed fiber optic sensor device 30A of first embodiment shown in FIG. 1, the employed optical filter 34 has a transmission wavelength that is the same as that of the anti-Stokes beam, and the anti-Stokes beam is detected by the photodetector 35 among the back-scattering light of the photonic band gap fiber 10. If the wavelength of the incident light is 1550 nm, for example, the transmission wavelength of the optical filter 34 is around 1450 nm. Among the back-scattering light transmitted the optical filter 34, the Rayleigh scattering light is received by the photodetector 35a and converted into electrical signals. Among the back-scattering light having transmitted the optical filter 34, the anti-Stokes beam of Raman scattering light is received by the photodetector 35b and converted into electrical signals. The electrical signals are processed in the signal processor 36 so as to provide temperature distribution along the longitudinal direction of the photonic band gap fiber 10. Temperature changes in locations along the longitudinal direction of the photonic band gap fiber 10 are obtained from a ratio of these electrical signals.

Strain detection may be conducted with the same method as a normal Brillouin optical time-domain analysis (BOTDR). That is, since a peak wavelength of natural Brillouin scattering light varies depending on existence of strain, strain along the longitudinal direction of the photonic band gap fiber 10 can be detected based on variation in the peak wavelength.

Second Embodiment

Figure 5:
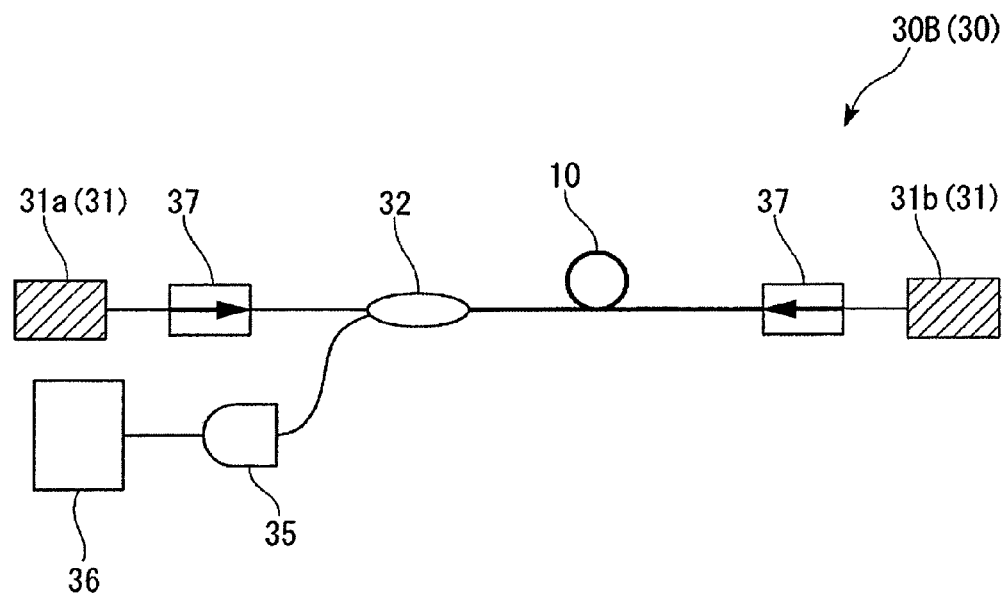
FIG. 5 schematically illustrates a distributed fiber optic sensor device according to another embodiment of the invention.

FIG. 5 schematically illustrates a distributed fiber optic sensor device 30B according to a second embodiment of the present invention. The distributed fiber optic sensor device 30B of the present embodiment includes a pulse light source 31, an optical isolator 37, an optical branching filter 32, a photonic band gap fiber 10, a photodetector 35 and a signal processor 36. The distributed fiber optic sensor device 30B of the present embodiment differs from the first embodiment in that pulsed light is incident from both ends of the photonic band gap fiber 10 so as to detect changes due, for example, to temperature and strain in scattered light within the photonic band gap fiber.

Pulsed light (i.e., a pump beam) output from one of pulse light sources 31a is input from the optical branching filter 33 to the photonic band gap fiber 10 through the optical isolator 37. Pulsed light (i.e., a probe beam) output from the other of pulse light sources 31b is input into the photonic band gap fiber 10 from the other end through the optical isolator 56. Stimulated scattering is caused due to counter propagation of the pump beam and the probe beam and the probe beam is amplified within the photonic band gap fiber 10. Here, since the wavelength band of the amplified probe beam is within the band gap width, the amplified probe beam is trapped in the central portion 14 of the photonic band gap fiber 10 so as to propagate within the fiber. On the other hand, since the wavelength band of the scattered light (i.e., the Stokes beam) having a wavelength longer than that of the probe beam generated due to the stimulated scattering is within the bandwidth, the scattered light will be blocked rather than allowed to propagate in the fiber. The amplified probe beam is received by the photodetector 35 through the optical branching filter 32 and is converted into electrical signals. The electrical signals are processed in the signal processor 36 so as to provide distribution of physical quantities along the longitudinal direction of the photonic band gap fiber 10.

In the present embodiment, as in the first embodiment, the stimulated Raman scattering can be suppressed without impairing the sensing performance since the loss may be selectively given to the wavelength of the Stokes beam generated due to stimulated Raman scattering in the photonic band gap fiber 10. As a result, light with higher power can therefore be incident into the photonic band gap fiber 10. Also in the distributed fiber optic sensor device according to the present embodiment, the measurement distance, the measurement range and the dynamic range can be extended while maintaining the spatial resolution. In addition, since the Stokes beam generated due to Raman scattering can be suppressed, a signal-to-noise ratio of the scattered light used as a signal is improved and more accurate measurement can therefore be provided.

For example, the BOTDA is employed for measuring temperature distribution using a distributed fiber optic sensor device according to the present embodiment. Since a peak wavelength of Brillouin gain spectrum varies depending on temperature, temperature changes along the longitudinal direction of the photonic band gap fiber 10 can be obtained based on a variation in the peak wavelength. The variation in the peak wavelength is obtained through counter propagation of the pump beam and the probe beam having frequency difference of about 10 GHz to measure the Brillouin gain spectrum.

In addition, the BOTDA is also employed in measurement of strain distribution. Since the peak wavelength of Brillouin gain spectrum varies depending also on existence of strain, strain along the longitudinal direction of the photonic band gap fiber 10 can be obtained based on a variation in the peak wavelength. The variation in the peak wavelength is obtained through counter propagation of the pump beam and the probe beam having frequency difference of about 10 GHz to measure the Brillouin gain spectrum.

EXAMPLES

Example

The distributed fiber optic sensor device 30A shown in FIG. 1 was produced in which the photonic band gap fiber shown in FIG. 2 was employed. The obtained device 30A was a distributed fiber optic sensor device of Example.

Comparative Example

A distributed fiber optic sensor device was produced in the same manner as in Example except that a normal single-mode fiber was employed in place of the photonic band gap fiber. The obtained device was a distributed fiber optic sensor device of Comparative Example.

Pulsed light having a wavelength of 1550 nm, a pulse width of 50 nsec and peak power of 2 W was input from a pulse light source into these distributed fiber optic sensor devices. The photonic band gap fiber used in Example has transmission loss of 0.2 dB/km at the wavelength of 1550 nm, which is almost the same as that of a single-mode fiber. The photonic band gap fiber has transmission loss of 6 dB/km at the wavelength of the Stokes beam. The transmission wavelength of the optical filter 34 was set to about 1450 nm which is the wavelength of the anti-Stokes beam generated due to Raman scattering considering the optical fiber distributed temperature sensor.

Figure 6:
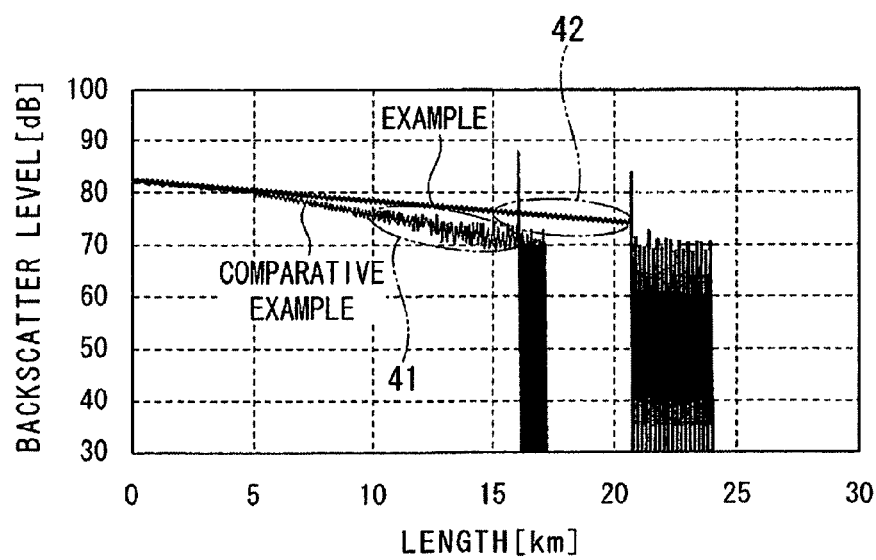
FIG. 6 is a distribution chart of an amount of generated anti-Stokes beam, illustrating results of comparative experiments in Example and Comparative Example.
Figure 7:
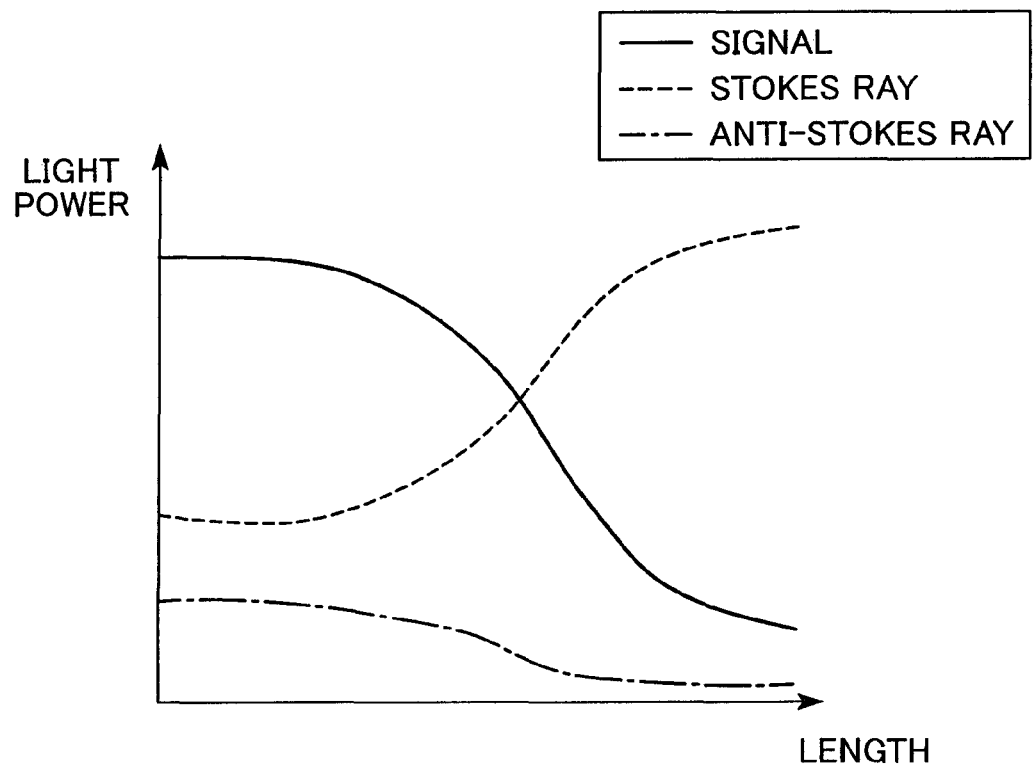
FIG. 7 is a graph showing a relationship between the length of an optical fiber according to a related art distributed fiber optic sensor device and optical power characteristics of an optical signal, a Stokes beam and an anti-Stokes beam.

The result is shown in FIG. 6. As shown in FIG. 6, the measurement range was about 10 km in Comparative Example in which a normal single-mode fiber was employed since the incident light power was attenuated due to stimulated Raman scattering and thus the anti-Stokes beam level became low. In Example in which the photonic band gap fiber was employed, it was confirmed that the measurement range was about 20 km, which was twice the length of the Comparative Example device. It was also shown that the measurement range could further be extended with increased transmission loss at the wavelength of the Stokes beam of the employed photonic band gap fiber.

It was also shown, from a comparison of the noise magnitudes in the area denoted by the reference numerals 41 (in Comparative Example) and 42 (in Example) in FIG. 6, that a signal-to-noise ratio of the anti-Stokes beam was improved in Example compared with Comparative Example. This is because the photonic band gap fiber also suppresses controls an occurrence of the Stokes beam.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A distributed fiber optic sensor device that employs a photonic band gap fiber as a sensing medium, the photonic band gap fiber, which is the sensing medium, comprising:
    a quartz section; and
    a plurality of high refractive index portions provided in the quartz section along a longitudinal direction of the photonic band gap fiber, the high refractive index portions being photonic band gaps periodically arranged to form a triangular-lattice pattern;
    the photonic band gap fiber has a bandwidth which includes a wavelength band of a Stokes beam generated due to stimulated Raman scattering;
    the photonic band gap fiber has a band gap width which includes a wavelength band of an anti-Stokes beam generated due to the stimulated Raman scattering and a wavelength band of an optical signal incident into the photonic band gap fiber, and
    the distributed fiber optic sensor device further comprising a pulse light source for inputting the optical signal into the photonic band gap fiber at both ends of the photonic band gap fiber.

2. The distributed fiber optic sensor device according to claim 1, wherein the high refractive index portions are arranged to form a 3 to 5 layer pattern.

3. The distributed fiber optic sensor device according to claim 1, wherein transmission loss with respect to the Stokes beam in the photonic band gap fiber is 12 to 30 times as large as transmission loss with respect to the optical signal.

4. The distributed fiber optic sensor device according to claim 1, wherein the device is for measuring temperature distribution along the longitudinal direction of the photonic band gap fiber.

5. The distributed fiber optic sensor device according to claim 1, wherein the device is for measuring strain distribution along the longitudinal direction of the photonic band gap fiber.

* * * * *